(12) United States Patent
Liu

(10) Patent No.: US 12,124,132 B2
(45) Date of Patent: Oct. 22, 2024

(54) BACKLIGHT MODULE AND DISPLAY DEVICE INCLUDING PRIVACY-PROTECTION DISPLAY MODE

(71) Applicant: Wuhan China Star Optoelectronics Technology Co., Ltd., Hubei (CN)

(72) Inventor: Guangkun Liu, Hubei (CN)

(73) Assignee: Wuhan China Star Optoelectronics Technology Co., Ltd., Wuhan (CN)

( * ) Notice: Subject to any disclaimer, the term of this patent is extended or adjusted under 35 U.S.C. 154(b) by 0 days.

(21) Appl. No.: 17/772,633

(22) PCT Filed: Apr. 22, 2022

(86) PCT No.: PCT/CN2022/088494
§ 371 (c)(1),
(2) Date: Apr. 28, 2022

(87) PCT Pub. No.: WO2023/193309
PCT Pub. Date: Oct. 12, 2023

(65) Prior Publication Data
US 2024/0168336 A1    May 23, 2024

(30) Foreign Application Priority Data
Apr. 7, 2022    (CN) .......................... 202210361167.5

(51) Int. Cl.
G02F 1/1335    (2006.01)
F21V 8/00    (2006.01)
(Continued)

(52) U.S. Cl.
CPC ..... *G02F 1/133626* (2021.01); *G02B 6/0036* (2013.01); *G02B 6/0051* (2013.01);
(Continued)

(58) Field of Classification Search
CPC ................. G02B 6/0076; G02F 1/1323; G02F 1/133626; G02F 1/133627; G02F 1/29
See application file for complete search history.

(56) References Cited

U.S. PATENT DOCUMENTS

2008/0112187 A1    5/2008    Katsumata
2009/0067156 A1*   3/2009    Bonnett ................ G02F 1/1323
                                                                     362/97.2
(Continued)

FOREIGN PATENT DOCUMENTS

CN            1940678        4/2007
CN          101999093        3/2011
(Continued)

OTHER PUBLICATIONS

International Search Report and the Written Opinion Dated Dec. 19, 2022 From the International Searching Authority Re. Application No. PCT/CN2022/088494 and Its Translation Into English. (20 Pages).

(Continued)

*Primary Examiner* — Keith G. Delahoussaye

(57) ABSTRACT

A backlight module and a display device are provided. The backlight module includes a first light-emitting component and a second light-emitting component. The first light-emitting component includes a regular light guide plate, and an angle between a light emitted by the first light-emitting component and a first direction is less than or equal to a first preset angle, and the first direction is perpendicular to the first direction. The second light-emitting component includes a collimated light guide plate, an angle between a light emitted by the second light-emitting component and the first direction is less than or equal to a second preset angle, and the second preset angle is less than the first preset angle.

19 Claims, 8 Drawing Sheets

(51) Int. Cl.
*G02F 1/13* (2006.01)
*G02F 1/29* (2006.01)

(52) U.S. Cl.
CPC ......... *G02B 6/0076* (2013.01); *G02F 1/1323* (2013.01); *G02F 1/133607* (2021.01); *G02F 1/133627* (2021.01); *G02F 1/29* (2013.01)

(56) References Cited

U.S. PATENT DOCUMENTS

| | | | |
|---|---|---|---|
| 2009/0316433 | A1 | 12/2009 | Shim |
| 2012/0235891 | A1 | 9/2012 | Nishitani |
| 2017/0153383 | A1* | 6/2017 | Lee ................... G02B 6/0068 |
| 2017/0261672 | A1* | 9/2017 | Liu ................... G02B 6/0068 |
| 2017/0269283 | A1 | 9/2017 | Wang |
| 2023/0107706 | A1* | 4/2023 | Liu ................... G02F 1/1323 362/97.1 |

FOREIGN PATENT DOCUMENTS

| | | |
|---|---|---|
| CN | 104880760 | 9/2015 |
| CN | 106597599 | 4/2017 |
| CN | 107229145 | 10/2017 |
| CN | 107664871 | 2/2018 |
| CN | 108845457 | 11/2018 |
| CN | 109870836 | 6/2019 |
| CN | 111812768 | 10/2020 |
| CN | 113238314 | 8/2021 |
| CN | 113281925 | 8/2021 |
| CN | 215181318 | 12/2021 |
| JP | 2006-106074 | 4/2006 |
| TW | I699596 | 7/2020 |

OTHER PUBLICATIONS

Notification of Office Action and Search Report Dated Apr. 19, 2023 From The State Intellectual Property Office of the People's Republic of China Re. Application No. 202210361167.5 and Its Translation Into English. (25 Pages).

* cited by examiner

BACKLIGHT MODULE AND DISPLAY DEVICE INCLUDING PRIVACY-PROTECTION DISPLAY MODE

RELATED APPLICATIONS

This application is a National Phase of PCT Patent Application No. PCT/CN2022/088494 having International filing date of Apr. 22, 2022, which claims the benefit of priority of Chinese Patent Application No. 202210361167.5 filed on Apr. 7, 2022. The contents of the above applications are all incorporated by reference as if fully set forth herein in their entirety.

FIELD AND BACKGROUND OF THE INVENTION

The present disclosure relates to a field of display technology, and more particularly, to a backlight module and a display device with the backlight module.

Display devices are used in various aspects of people's daily life, and different applications have different requirements for view angles of the display devices. For example, when a user is in an open environment that requires confidentiality, such as entering a withdrawal password, or checking private information or business negotiation on public transportation, the display devices are required to have narrow view angles to achieve a purpose of privacy protection for protecting personal privacies. When the user is in an environment that requires sharing, for example, when viewing a display device with others, a wider view angle is required to achieve a purpose of sharing.

Currently, a privacy-protection film, such as a microlouver structure, is often added to the display device to reduce a view angle of a screen, so as to achieve a privacy-protection function of the display device.

However, the privacy-protection film is usually attached to a cover of the display device, and a light transmittance of the privacy-protection film is small, which reduces a display brightness of the screen. If the display brightness before the privacy-protection film is added is needed to be maintained, then an input power needs to be increased, causing increase in power consumption, and a dynamic privacy-protection effect is unable to be achieved.

SUMMARY OF THE INVENTION

A backlight module and a display device are provided by the present application, which can achieve a dynamic privacy-protection function without reducing a display brightness of the display device.

The present application provides a display device, the display device including a display panel and a backlight module disposed on a side of the display panel.

The back light module includes:
a first light-emitting component including a regular light guide plate disposed on a side of the display panel and at least one first light source disposed on a peripheral side of the regular light guide plate, wherein an angle between a light emitted by the first light-emitting component and a first direction is less than or equal to a first preset angle, and the first direction is a direction from the backlight module to the display panel;
a second light-emitting component including a collimated light guide plate disposed on a side of the regular light guide plate and at least one second light source disposed on a peripheral side of the collimated light guide plate, wherein an angle between a light emitted by the second light-emitting component and the first direction is less than or equal to a second preset angle, and the second preset angle is less than the first preset angle;
wherein the display device switches between a regular display mode and a privacy-protection display mode, in the normal display mode, the at least one first light source is turned on, and in the privacy-protection display mode, the first light source is turned off and the second light source is turned on.

In an embodiment of the present application, a first light diffusing structure is provided on a side of the regular light guide plate away from the display panel, the collimated light guide plate includes a light guide plate body and a light convergent layer disposed on a side of the light guide plate body adjacent to the display panel, and a second light diffusing structure is provided on a side of the light guide plate body away from the light convergent layer.

In an embodiment of the present application, the second light diffusing structure includes a plurality of first protrusions disposed on the side of the light guide plate body away from the light convergent layer, a plurality of second protrusions are disposed on a side of the light convergent layer away from the light guide plate body, and one of the plurality of first protrusions is disposed correspondingly to one of the plurality of second protrusions.

In an embodiment of the present application, in a direction from the plurality of first protrusions to the plurality of second protrusions correspondingly, a cross-sectional area of the plurality of first protrusions along a direction parallel to the collimated guide plate gradually increases, and a cross-sectional area of the plurality of second protrusions along the direction parallel to the collimated light guide plate gradually decreases;
wherein an orthographic projection of the plurality of first protrusions on the display panel overlaps an orthographic projection of the plurality of second protrusions on the display panel.

In an embodiment of the present application, wherein a distribution density of the plurality of first protrusions gradually increases in a direction away from the second light source.

In an embodiment of the present application, a material of the light guide plate body is same as a material of the light convergent layer.

In an embodiment of the present application, the second light diffusing structure includes a plurality of concave portions disposed on the side of the light guide plate body away from the light convergent layer, a plurality of convex lens portions are disposed on a side of the light convergent layer away from the light convergent layer, and one of the plurality of concave portions is disposed corresponding to one of the plurality of convex lens portions.

In an embodiment of the present application, an orthographic projection of each of the plurality of concave portions on the display panel is within a coverage range of an orthographic projection of the plurality of convex lens portions correspondingly on the display panel, and a center line of the plurality of concave portions coincides with a main optical axis of the plurality of convex lens portions.

In an embodiment of the present application, each of the plurality of concave portions is at a focal point on a side of the plurality of convex lens portions correspondingly adjacent to the light guide plate body.

In an embodiment of the present application, a refractive index of the light convergent layer is greater than a refractive index of the light guide plate body, and the light convergent layer is attached to the side of the light guide plate body adjacent to the display panel or the light convergent layer and the light guide plate body are spaced apart.

In an embodiment of the present application, the second light source is disposed on a peripheral side of the light guide plate body, so that the light emitted by the second light source enters the light guide plate body.

In an embodiment of the present application, a distribution density of the plurality of concave portions gradually increases in a direction away from the second light source.

In an embodiment of the present application, a plurality of prism structures are disposed on a side of the light convergent layer adjacent to the light guide plate body, and a cross-sectional area of each of the plurality of prism structures along a direction of being closer to the light guide plate body gradually decreases, and the side of the light convergent layer adjacent to the light guide plate body is parallel to a side of the light guide plate body adjacent to the light convergent layer.

In an embodiment of the present application, the peripheral side of the light guide plate body includes a light incident side provided with the at least one second light source, a thickness of the light guide plate body along a direction of being away from the light incident side gradually decreases, the side of the light guide plate body away from the light convergent layer is parallel to the display panel, and a surface on the side of the light guide plate body adjacent to the light convergent layer is arranged to be inclined to the display panel.

In an embodiment of the present application, a surface on a side of the light guide plate body adjacent to the light convergent layer is parallel to the display panel, and the second light diffusing structure includes a plurality of grooves disposed on the side of the light guide plate body away from the light convergent layer, and each of the plurality of grooves includes a light diffusion surface adjacent to a side of the second light source, wherein, in a direction away from the second light source, a distance from the light diffusion surface to the display panel gradually decreases, and an angle between the light diffusion surface and the display panel is greater than or equal to 10° and less than or equal to 20°.

In an embodiment of the present application, the second light-emitting component is disposed on a side of the first light-emitting component adjacent to the display panel and the backlight module further includes a diffuser film disposed between the second light-emitting component and the first light-emitting component;

or, the second light-emitting component is disposed on a side of the first light-emitting component away from the display panel.

In an embodiment of the present application, the backlight module further includes a brightness-enhancing film and a reflective sheet, the brightness-enhancing film is disposed on a side of the first light-emitting component and a side of the second light-emitting component that are both adjacent to the display panel, and the reflective sheet is disposed on a side of the first light-emitting component and a side of the second light-emitting component that are both away from the display panel.

In an embodiment of the present application, a number of the first light source is greater than or equal to one, and a number of the second light source is less than or equal to two.

According to the above-mentioned purpose of the present application, a backlight module is provide. The backlight module includes:

a first light-emitting component including a regular light guide plate and at least one first light source disposed on a peripheral side of the regular light guide plate, wherein an angle between a light emitted by the first light-emitting component and a first direction is less than or equal to a first preset angle, and the first direction is a direction vertical to the regular light guide plate;

a second light-emitting component including a collimated light guide plate disposed on a side of the regular light guide plate and at least one second light source disposed on a peripheral side of the collimated light guide plate, wherein an angle between a light emitted by the second light-emitting component and the first direction is less than or equal to a second preset angle, and the second preset angle is less than the first preset angle;

wherein the backlight module switches between a first mode and a second mode, in the first mode, the at least one first light source is turned on, and in the second mode, the first light source is turned off and the second light source is turned on.

In an embodiment of the present application, the backlight module includes a light-emitting surface, a first light diffusing structure is provided on a side of the regular light guide plate away from the light-emitting surface, and the collimated light guide plate includes a light guide plate body and a light convergent layer disposed on a side of the light guide plate body adjacent to the light-emitting surface, and a second light diffusing structure is disposed on a side of the light guide plate body away from the light convergent layer.

Compared with the prior art, the present application provides the first light-emitting component and the second light-emitting component in the backlight module. The second light-emitting component includes the collimated light guide plate, so as to converge the light emitted by the second light source. A maximum light-emitting angle of the second light-emitting component is less than a maximum light-emitting angle of the first light-emitting component. Furthermore, in the regular display mode, the at least one first light source is turned on, i.e., at least the first light-emitting component is utilized for achieving a normal display. In the privacy-protection display mode, the second light source is turned on and the first light source is turned off, i.e., only the second light-emitting component is utilized to reduce a view angle range of the display device, thereby achieving a privacy-protection display. Therefore, the present application can achieve the dynamic privacy-protection function without reducing the display brightness of the display device.

BRIEF DESCRIPTION OF THE SEVERAL VIEWS OF THE DRAWINGS

The following describes specific embodiments of the present application in detail with reference to the accompanying drawings, which will make technical solutions and other beneficial effects of the present application obvious.

DESCRIPTION OF SPECIFIC EMBODIMENTS OF THE INVENTION

The technical solution of the present application embodiment will be clarified and completely described with reference accompanying drawings in embodiments of the present application embodiment. Obviously, the present application described parts of embodiments instead of all of the embodiments. Based on the embodiments of the present application, other embodiments which can be obtained by a skilled in the art without creative efforts fall into the protected scope of the present application.

The following application provides many different embodiments or examples for implementing different structures of the present application. To simplify the application of the present application, the components and settings of specific examples are described below. Obviously, these are merely examples instead of limitation of the present application. Furthermore, the present application may repeat reference numbers and/or reference letters in different examples, and such repetition is for the purpose of simplicity and clarity, and does not indicate the relationship between the various embodiments and/or settings. Moreover, the present application provides examples of various specific processes and materials, but the applicability of other processes and/or application of other materials may be appreciated by a person skilled in the art.

Figure 1:
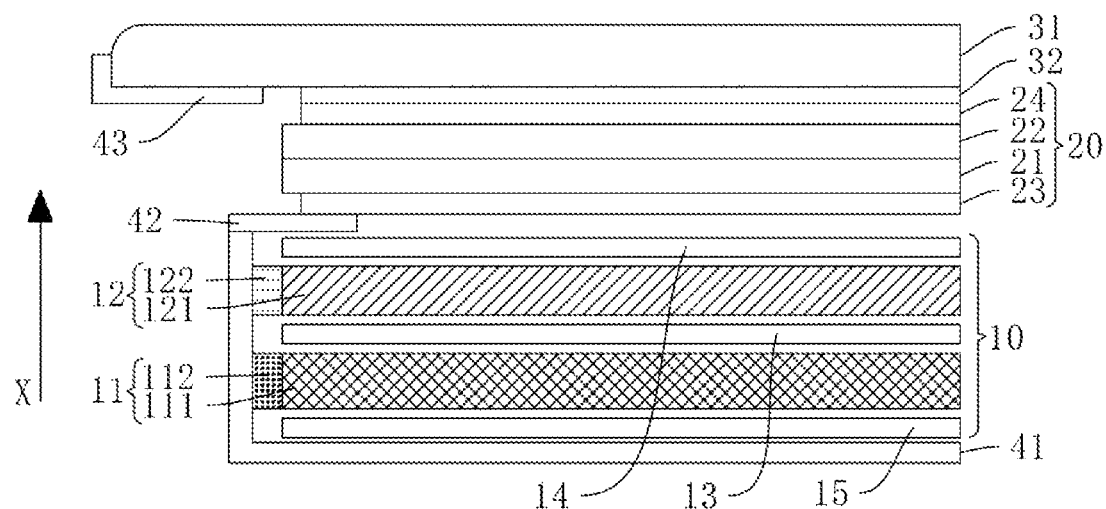
FIG. 1 is a schematic view of a type of structure of a display device provided by an embodiment of the present application.

A display device is provided in an embodiment of the present application. Referring to FIG. 1, the display device includes a display panel 20 and a backlight module 10 disposed on a side of the display panel 20.

Furthermore, the backlight module 10 includes a first light-emitting component 11 and a second light-emitting component 12.

The first light-emitting component 11 includes a regular light guide plate 111 disposed on a side of the display panel 20 and at least one first light source 112 disposed on a peripheral side of the regular light guide plate 111, and an angle between a light emitted by the first light-emitting component 11 and a first direction X is less than or equal to a first preset angle, and the first direction X is a direction from the backlight module 10 to the display panel 20.

The second light-emitting component 12 includes a collimated light guide plate 121 disposed on a side of the regular light guide plate 111 and at least one second light source 122 disposed on a peripheral side of the collimated light guide plate 121, and an angle between a light emitted by the second light-emitting component 12 and the first direction X is less than or equal to a second preset angle, and the second preset angle is less than the first preset angle.

The display device switches between a regular display mode and a privacy-protection display mode. In the regular display mode, the at least one first light source 112 is turned on. In the privacy-protection display mode, the at least one first light source 112 is turned off and the at least one second light source 122 is turned on.

In a practical implementation process, in an embodiment of the present application, the first light-emitting component 11 and the second light-emitting component 12 are provided in the backlight module 10, the second light-emitting component 12 includes the collimated light guide plate 121, so as to converge the light emitted by the at least one second light source 122, and a maximum light exit angle of the second light-emitting component 12 is smaller than a maximum light exit angle of the first light-emitting component 11. Furthermore, in the regular display mode, the at least one first light source 112 is turned on, i.e., at least the first light-emitting component 11 is utilized, so as to achieve a regular display. In the privacy-protection display mode, the at least one second light source 122 is turned on and the at least one first light source 112 is turned off, i.e., only the second light-emitting component 12 is utilized, so as to reduce a view angle range of the display device, thereby achieving the privacy-protection display. Therefore, a dynamic privacy-protection function can be achieved by the present application without reducing a display brightness of the display device.

It should be noted that the backlight module 10 is provided with a light-emitting surface, and the display panel 20 is provided on a side of the backlight module 10 provided with the light-emitting surface, so as to provide a backlight source for the display panel 20. In addition, the regular light guide plate 111 and the collimated light guide plate 121 are stacked on a side of the display panel 20 along the first direction X. Furthermore, the regular light guide plate 111 provided in an embodiment of the present application can be provided with a dot structure on a lower surface, which is same as an existing light guide plate, so as to diffuse the light emitted by a first light source 112. The collimated light guide plate 121 can converge the light emitted by a second light source 122, so that the light emitted by the second light source 122 can be deflected in the first direction X for light exiting; therefore, when only the second light source 122 is turned on, a display effect with a small view angle range can be achieved, i.e., a privacy-protection display effect can be achieved.

Figure 2:
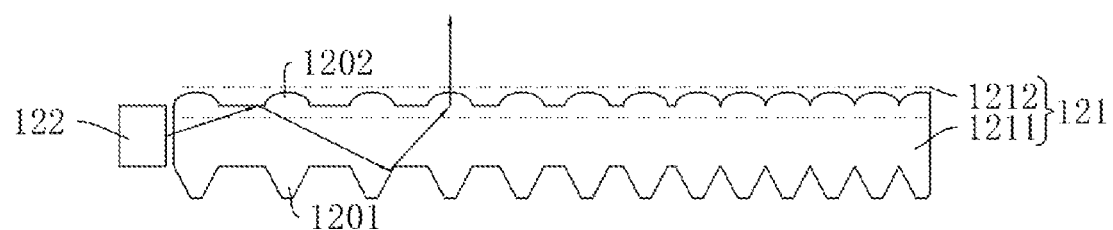
FIG. 2 is a schematic view of a type of structure of a second light-emitting component provided by an embodiment of the present application.
Figure 3:
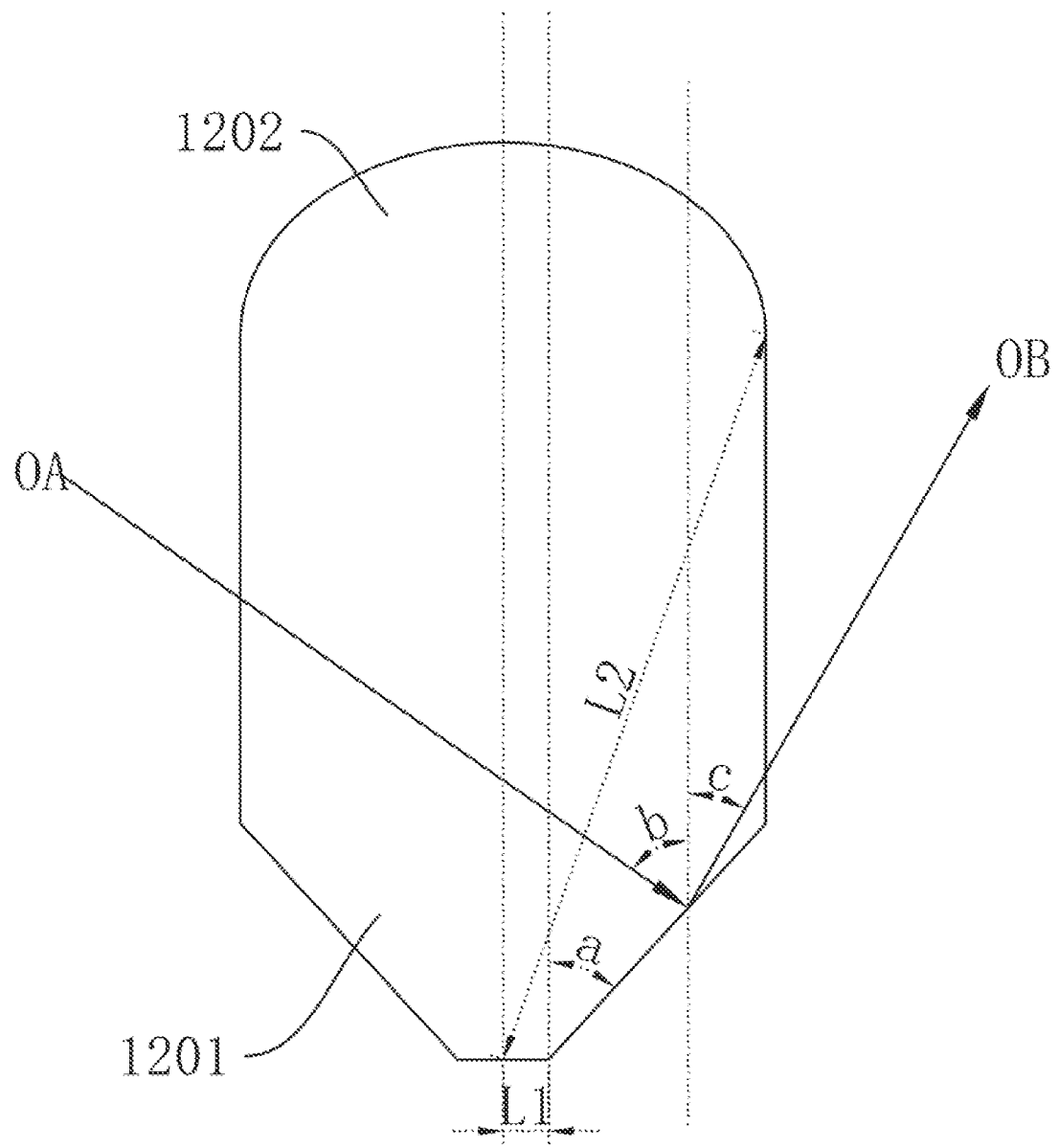
FIG. 3 is a schematic view of a structure of a plurality of first protrusions and a plurality of second protrusions of a collimated light guide plate provided by an embodiment of the present application.

Specifically, referring to FIG. 1, FIG. 2, and FIG. 3, in an embodiment of the present application, the display device includes the backlight module 10 and the display panel 20. The backlight module 10 includes the light-emitting surface, and the display panel 20 is provided on the side of the backlight module 10 provided with the light-emitting surface.

The display panel 20 includes an array substrate 21 and a color filter substrate 22 disposed opposite to each other, a lower polarizer 23 disposed on a side of the array substrate 21 away from the color filter substrate 22, and an upper polarizer 24 disposed on a side of the color filter substrate 22 away from the array substrate 21.

It can be understood that the array substrate 21 and the color filter substrate 22 mentioned above only show a portion of a structure and components of the display panel 20, but not limited thereto. For example, the color filter substrate 22 includes a black matrix (BM), an RGB color layer, etc., and the array substrate 21 includes thin-film transistor (TFT) switches, scan lines, data lines, pixel electrodes, common electrodes, etc. The display panel 20 further includes other display components, such as an alignment film, a liquid crystal layer, a sealant, etc., between the array substrate 21 and the color filter substrate 22. More details can be implemented with reference to the prior art, and will not be reiterated herein.

The backlight module 10 is disposed on a side of the display panel 20 provided with the lower polarizer 23, i.e., the backlight module 10 is disposed on a side of the lower polarizer 23 away from the array substrate 21.

Furthermore, the backlight module 10 includes the first light-emitting component 11, the second light-emitting component 12 disposed on a side of the first light-emitting component 11 adjacent to the display panel 20, a diffuser film disposed between the first light-emitting component 11 and the second light-emitting component 12, a brightness-enhancing film 14 disposed on a side of the second light-emitting component 12 adjacent to the display panel 20, and a reflective sheet 15 disposed on a side of the first light-emitting component 11 away from the display panel 20.

It should be noted that, in an embodiment of the present application, a cover plate 31, a first frame body 41, a second frame body 42, and a third frame body 43 are further included. The backlight module 10 is disposed in the first frame body 41, the second frame body 42 is disposed between the first frame body 41 and the display panel 20 for supporting the display panel 20, the cover plate 31 is attached to a side of the display panel 20 away from the backlight module 10 through a transparent adhesive layer 32, and the third frame body 43 is disposed on a peripheral side of the cover plate 31 to support and reinforce the cover plate 31.

The first light-emitting component 11 includes the regular light guide plate 111 disposed on the side of the lower polarizer 23 away from the array substrate 21 and the at least one first light source 112 disposed on the peripheral side of the regular light guide plate 111, i.e., in the first light source 112 is arranged in the first light-emitting component 11 in a lateral type arrangement, so that the light emitted by the first light source 112 incident from the peripheral side of the regular light guide plate 111. In addition, a first light diffusing structure (not shown) is provided on the side of the regular light guide plate 111 away from the display panel 20. Specifically, the first light diffusing structure includes a plurality of dots disposed on the side of the regular light guide plate 111 away from the display panel 20, which can be manufactured through laser engraving or laser technologies, so as to diffuse the light emitted by the first light source 112 which incidents into the regular light guide plate 111, so that the first light-emitting component 11 has a light exit effect with a large view angle, and the angle between the light emitted by the first light-emitting component 11 and the first direction X is less than or equal to the first preset angle.

The second light-emitting component 12 is disposed between the first light-emitting component 11 and the display panel 20, and the second light-emitting component 12 includes the collimated light guide plate 121 disposed between the first light-emitting component 11 and the display panel 20 and the at least one second light source 122 disposed on the peripheral side of the collimated light guide plate 121. The collimated light guide plate 121 can converge the light emitted by the second light source 122, so that the light emitted by the second light source 122 can be deflected in the first direction X after passing through the collimated light guide plate 121 for the light exiting, so as to achieve a display effect with a small view angle and the privacy-protection display. Specifically, the angle between the light emitted by the second light-emitting component 12 and the first direction X is less than or equal to the second preset angle, and the second preset angle is less than the first preset angle.

In an embodiment of the present application, the display device can switch between the regular display mode and the privacy-protection display mode. When the display device is in the regular display mode, the at least one first light source 112 is turned on, so that a display effect with a large view angle range can be achieved. When the display device is in the privacy-protection display mode, the at least one second light source 122 is turned on and the at least one first light source 112 is turned off, so that the display effect with a small view angle range can be achieved, and the dynamic privacy-protection display can be achieved. Compared with the related art, since attaching a privacy-protection film to the display device is not necessary, a light transmittance of the display device is not reduced, and the display brightness of the display device is assured.

Specifically, referring further to FIG. 1, FIG. 2, and FIG. 3, the second light emitting assembly 12 converges the light emitted by the second light source 122 through the collimated light guide plate 121. The collimated light guide plate 121 includes a light guide plate body 1211 and a light convergent layer 1212 disposed on a side of the light guide plate body 1211 adjacent to the display panel 20. A second light diffusing structure is disposed on a side of the light guide plate body 1211 away from the light convergent layer 1212, and the second light diffusing structure diffuses the light emitted by the second light source 122, so that the light emitted by the second light source 122 incidents into the light convergent layer 1212 in a scattered shape. The light convergent layer 1212 can converge an incident light, so that after the light emitted by the second light source 122 passes through the collimated light guide plate 121, the light can be deflected in the first direction X for the light exiting, so as to achieve the display effect with a small view angle.

Furthermore, the backlight module 10 further includes a diffuser film 13 disposed between the first light-emitting component 11 and the second light-emitting component 12, so as to further diffuse the light emitted by the first light-emitting component 11 and enhance the display effect with a large view angle in the regular display mode. The backlight module 10 further includes the brightness-enhancing film 14 disposed on the side of the second light-emitting component 12 adjacent to the display panel 20, so as to further converge the light emitted by the second light-emitting component 12. A reflective sheet 15 is disposed on the side of the first light-emitting component 11 away from the display panel 20, so as to reflect light and increase a light utilization rate and a light exit intensity.

In this embodiment, the second light diffusing structure includes a plurality of first protrusions 1201 disposed on the side of the light guide plate body 1211 away from the light convergent layer 1212 and a plurality of second protrusions 1202 disposed on a side of the light convergent layer 1212 away from the light guide plate body 1211, and the plurality of first protrusions 1201 and the plurality of second protrusions 1202 are correspondingly disposed. The light emitted by the second light source 122 passes through an inner wall of the plurality of first protrusions 1201 and reaches the plurality of second protrusions 1202 after being diffused and reflected. The plurality of second protrusions 1202 serve as convex lens structures which can converge and deflect the incident light in the first direction X for the light exiting.

In the direction from the plurality of first protrusions 1201 to the plurality of second protrusions 1202, i.e., in the first direction X, a cross-sectional area of the plurality of first protrusions 1201 along a direction parallel to the collimated light guide plate 121 gradually increases, and a cross-sectional area of the plurality of second protrusions 1202 along the direction parallel to the collimated light guide plate 121 gradually decreases.

Furthermore, an orthographic projection of the plurality of first protrusions 1201 on the display panel 20 overlaps with an orthographic projection of the plurality of second protrusions 1202 correspondingly on the display panel 20.

Optionally, a cross-sectional shape of the plurality of first protrusions 1201 is an inverted trapezoid, and a cross-sectional shape of the plurality of second protrusions 1202 is a circular arc shape, i.e., the plurality of first protrusions 1201 can be protruded from a surface of a side of the light guide plate body 1211 away from the light convergent layer 1212 in truncated cone shapes, and the plurality of second protrusions 1202 can be protruded from a surface of a side of the light convergent layer 1212 away from the light guide plate body 1211 in hemispherical shapes.

A material of the light guide plate body 1211 is same as a material of the light convergent layer 1212, and are integrally formed.

Referring to FIG. 3, which is an enlarged schematic structural view of the plurality of first protrusions 1201 and the plurality of second protrusions 1202 correspondingly. A half width L1 of a side of the plurality of first protrusions 1201 away from the plurality of second protrusions 1202 is greater than or equal to 5 micrometers and less than or equal to 10 micrometers. An arc width L2 of an arc contour of the plurality of second protrusions 1202 to a center of the plurality of first protrusions 1201 away from the light convergent layer 1212 is greater than or equal to 22 micrometers and less than or equal to 47 micrometers. An angle a between a waist portion of the inverted trapezoid of the plurality of first protrusions 1201 and the first direction X is greater than or equal to 30°, and less than or equal to 35°. In a practical implementation process, a size of the plurality of first protrusions 1201 and a size of the plurality of second protrusions 1202 are optional according to actual needs, and are not limited thereto.

In this embodiment, a thickness of the collimated light guide plate 121 is set to be 0.1 micrometers, a material of the collimated light guide plate 121 can include polymethyl methacrylate (PMMA), a refractive index of the collimated light guide plate 121 is 1.49, the angle a is 33°, a distance between adjacent first protrusions 1201 or adjacent second protrusions 1202 is 0.092 micrometers, the half width L1 is 8 micrometers, and the arc width L2 is 38 micrometers.

At this time, it can be obtained through testing that an angle b between an incident light OA and the first direction X on a sidewall of the plurality of first protrusions 1201 is greater than or equal to 42.5° and less than or equal to 90°, and an angle c between a reflected light OB and the first direction X are greater than or equal to −24° and less than or equal to 24°. If a ratio of a light exit surface (i.e., an arc shaped inner wall of the plurality of second protrusions 1202) to a light incident surface (i.e., an inverted trapezoidal inner wall of the plurality of first protrusions 1201) is greater than 5, a larger light exit area can be effectively obtained, and the light exit effect and a light exit uniformity can be enhanced.

Figure 4:
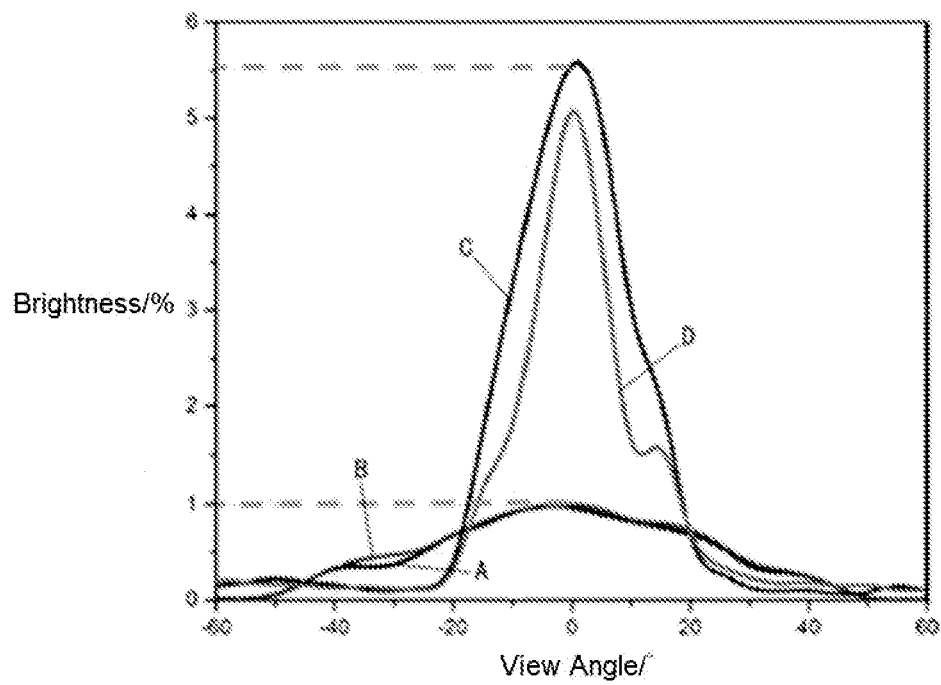
FIG. 4 is a curve diagram of a type of privacy-protection view angle and brightness of a backlight module provided by an embodiment of the present application.

Results as shown in FIG. 4 can be obtained through an optical simulation, in which an abscissa indicates a view angle, and an ordinate indicates a ratio of a brightness at other view angles to a brightness at a front view angle. Curve A indicates a curve of a vertical view angle and a brightness of a conventional privacy-protection backlight module, curve B indicates a curve of a horizontal view angle and the brightness of the conventional privacy-protection backlight module, curve C indicates a curve of a vertical view angle and a brightness of the backlight module provided by the embodiment of the application, and curve D indicates a curve of a horizontal view angle and the brightness of the backlight module provided by the embodiment of the application. It can be seen from FIG. 4 that the conventional privacy-protection backlight module is added with a privacy-protection film, causing the brightness in a horizontal direction and a vertical direction not exceeding 1% even at the front view angle, as for the backlight module provided by the embodiment of the present application, within plus or minus 20°, the brightness increases sharply, the privacy-protection effect with a small view angle can be achieved, and the brightness is greatly increased compared with the conventional privacy-protection backlight module. Therefore, the display device provided by the embodiment of the present application can achieve the privacy-protection effect which is great and a dynamic privacy-protection effect under a premise of assuring the brightness of the display device, and switch between the regular display mode and the privacy-protection display mode.

It should be noted that, in an embodiment of the present application, the cross-sectional area of the first plurality of protrusions 1201 and the cross-sectional area of the second protrusions 1202 along the first direction X are both relatively small, which has a minor influence on the light incident from the first light-emitting component 11 to the second light-emitting component 12. That is to say, the display effect of a large view angle is not affected when the first light-emitting component 11 is working; in addition, a light angle compensation can also be performed on the regular light guide plate 111, such as increasing a depth of each of the plurality of dots in the first light diffusing structure.

Furthermore, in an embodiment of the present application, a number of the at least one first light source 112 can be greater than or equal to 1. With an increase of the number, and a light exit brightness of the backlight module 10 can be increased. A number of the at least one second light source 122 can be less than or equal to 2, if a sum of the at least one second light source 122 is too large, a light intensity of the at least one second light source 122 entering the collimated light guide plate 121 will be increased, which reduces the privacy-protection effect.

Preferably, in a direction of being away from the second light source 122, a distribution density of the plurality of first protrusions 1201 gradually increases, e.g., an increase in number, i.e., in an area away from the second light source 122, an amount of light is reduced. Therefore, the distribution density of the plurality of first protrusions 1201 is increased to enhance a reflection effect and the light exit uniformity of the backlight module 10.

Subsequently, in an embodiment of the present application, the at least one first light source 112 is turned on to achieve the regular display mode with a large view angle, and the at least one second light source 122 is turned on and the at least one first light source 112 is turned off to achieve the privacy-protection display mode with a small view angle. Therefore, the dynamic privacy-protection function can be achieved by the present application without reducing the display brightness of the display device.

Figure 5:
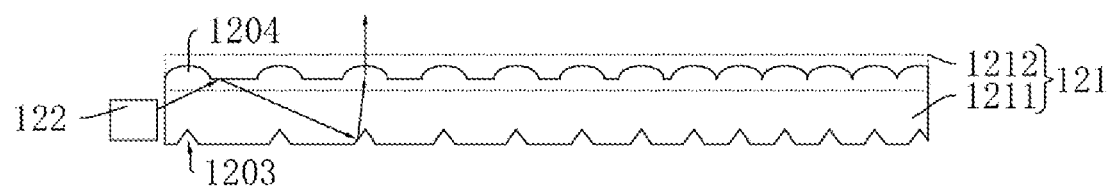
FIG. 5 is a schematic view of another type of structure of the second light-emitting component provided by an embodiment of the present application.
Figure 6:
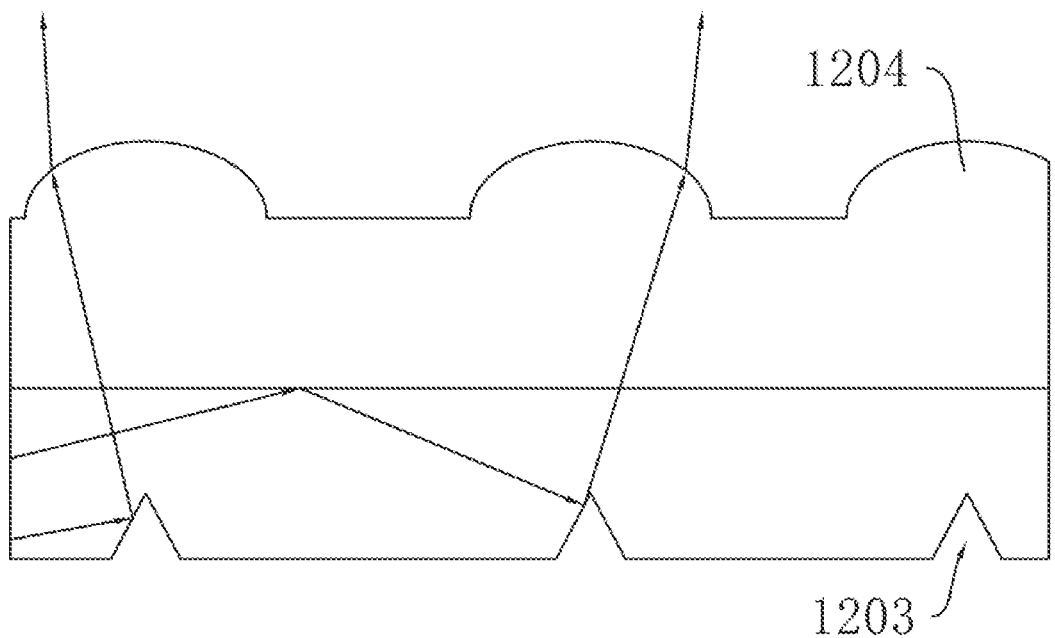
FIG. 6 is a schematic view of a structure of a plurality of concave portions and a plurality of convex lens portions of the collimated light guide plate provided by an embodiment of the present application.

In another embodiment of the present application, referring to FIG. 1, FIG. 5, and FIG. 6, differences between this embodiment and the previous embodiment is that a structure of the second light-emitting component 12 is different.

Specifically, the second light-emitting component 12 includes the collimated light guide plate 121 and the at least one second light source 122 disposed on the peripheral side of the collimated light guide plate 121. The collimated light guide plate 121 includes the light guide plate body 1211 and the light convergent layer 1212 disposed on the side of the light guide plate body 1211 adjacent to the display panel 20. In an embodiment of the present application, the light convergent layer 1212 and the light guide plate body 1211 are arranged separately. That is to say, the material of the light guide plate body 1211 is different from the material of the light convergent layer 1212, and the light guide plate body 1211 can be attached to the light convergent layer 1212 through an adhesive layer, or the light guide plate body 1211 and the light convergent layer 1212 can be spaced apart to form a slit, so that the slit can be filled with air and then a cross-section capable of total reflection can be formed between the light guide plate body 1211 and the light convergent layer 1212 to enhance the light utilization rate. Optionally, the adhesive layer can be a low-refractive index adhesive, such as NOA 1315 adhesive.

In an embodiment of the present application, a refractive index of the light convergent layer 1212 is greater than a refractive index of the light guide plate body 1211, and the second light source 122 is disposed on a peripheral side of the light guide plate body 1211, so that light only enters the light guide plate body 1211.

Specifically, the second light diffusing structure is disposed on the side of the light guide plate body 1211 away from the light convergent layer 1212, and the second light diffusing structure includes a plurality of concave portions 1203 disposed on the side of the light guide plate body 1211 away from the light convergent layer 1212, and a plurality of convex lens portions 1204 disposed on the side of the light convergent layer 1212 away from the light guide plate body 1211. One of the plurality of concave portions 1203 is disposed corresponding to one of the plurality of convex lens portions 1204.

Preferably, an orthographic projection of each of the plurality of concave portions 1203 on the display panel 20 is within a coverage range of an orthographic projection of the plurality of convex lens portions 1204 correspondingly on the display panel 20, and a center line of the plurality of concave portions 1203 coincides with a main optical axis of the plurality of convex lens portions 1204. Furthermore, each of the plurality of concave portions 1203 is at a focal point on a side of the plurality of convex lens portions 1204 correspondingly adjacent to the light guide plate body 1211, and lights diffused and reflected by the plurality of concave portions 1203 can be regarded as lights emitted from the focal point of the plurality of convex lens portions 1204. After passing through the plurality of convex lens portions 1204, lights emitted parallel to the main optical axis of the plurality of convex lens portions 1204 can be formed, i.e., lights parallel to the first direction X can be obtained, so as to achieve the privacy-protection display with a small view angle.

In a direction from the plurality of concave portions 1203 to the plurality of convex lens portions 1204, i.e., the first direction X, a cross-sectional area of the plurality of concave portions 1203 gradually increases, and a cross-sectional area of the plurality of convex lens portions 1204 gradually decreases. Furthermore, a cross-sectional shape of the plurality of concave portions 1203 can be a triangle, such as an isosceles triangle, a cross-sectional shape of the plurality of convex lens portions 1204 can be an arc.

Optionally, a thickness of the light guide plate body 1211 is greater than or equal to 0.1 micrometers and less than or equal to 0.8 micrometers, a thickness of the light convergent layer 1212 is greater than or equal to 0.1 micrometers and less than or equal to 0.8 micrometers, the plurality of concave portions 1203 in the shape of a triangle has a side greater than or equal to 200 micrometers and less than or equal to 300 micrometers, and the plurality of convex lens portions 1204 in the shape of an arc has a radius greater than or equal to 500 micrometers and less than or equal to 700 micrometers.

Figure 7:
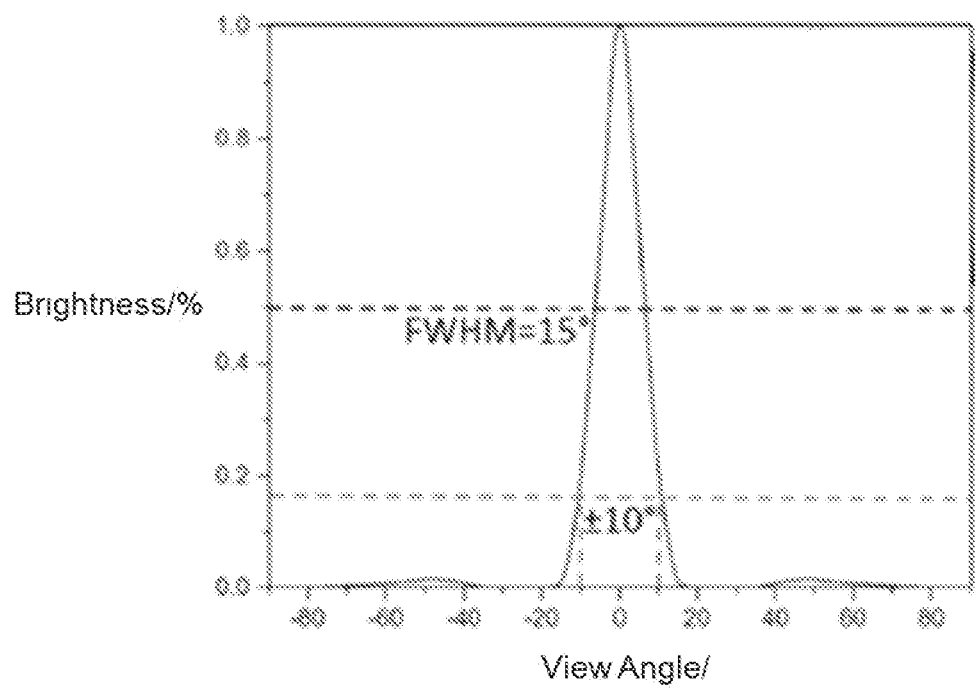
FIG. 7 is a curve diagram of another type of privacy-protection view angle and brightness of the backlight module provided by an embodiment of the present application.

In this embodiment, the thickness of the light guide plate body 1211 and the thickness of the light convergent layer 1212 are set to be 0.5 micrometers, the side length of the plurality of concave portions 1203 is 150 micrometers, and the radius of the plurality of convex lens portions 1204 is 600 micrometers. In addition, through an optical simulation, a curve diagram of view angle and brightness as shown in FIG. 7 is obtained, in which an abscissa indicates the view angle, and an ordinate indicates a result of normalized brightness.

Specifically, the brightness of the backlight module 10 provided by an embodiment of the present application, the brightness increases sharply within a view angle range of plus or minus 20°, and the brightness in a large view angle range beyond plus or minus 20° is extremely low. Furthermore, within a view angle range of plus or minus 10°, the brightness can substantially reach 0.2 or more, a half-peak width brightness of the curve can reach 0.5, and the view angle range is 15°, which indicates that the backlight module 10 provided by the embodiment of the present application is in a front view direction and has a great brightness display effect, and in a large view angle range, the brightness is extremely low, thereby achieving an effective privacy-preventing display effect.

It should be noted that in a direction away from the at least one second light source 122, the distribution density of the plurality of concave portions 1203 gradually increases, e.g., an increase in number, i.e., in an area away from the at least one second light source 122, an amount of light is reduced. Therefore, a distribution density of the plurality of concave portions 1203 is increased to enhance the reflection effect and the light exit uniformity of the backlight module 10.

Subsequently, in an embodiment of the present application, the at least one first light source 112 is turned on to achieve the regular display mode with a large view angle, and the at least one second light source 122 is turned on and the at least one first light source 112 is turned off to achieve the privacy-protection display mode with a small view angle. Therefore, the dynamic privacy-protection function can be achieved by the present application without reducing the display brightness of the display device.

Figure 8:
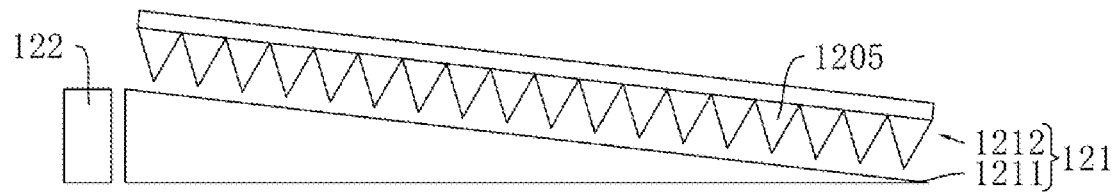
FIG. 8 is a schematic view of yet another type of structure of the second light-emitting component provided by an embodiment of the present application.

In yet another embodiment of the present application, referring to FIG. 8, differences between this embodiment and a first embodiment is that the structure of the second light-emitting component 12 is different.

The second light-emitting component 12 includes the collimated light guide plate 121 disposed between the first light-emitting component 11 and the display panel 20 and the second light source 122 disposed on the peripheral side of the collimated light guide plate 121. The collimated light guide plate 121 includes the light guide plate body 1211 and the light convergent layer 1212 disposed on the side of the light guide plate body 1211 adjacent to the display panel 20.

Specifically, the second light diffusing structure is disposed on the side of the light guide plate body 1211 away from the light convergent layer 1212, and the second light diffusing structure includes a plurality of diffusing dots on the side of the light guide plate body 1211 away from the light convergent layer 1212, and a plurality of prism structures 1205 are disposed on a side of the light convergent layer 1212 adjacent to the light guide plate body 1211, and a cross-sectional area of each of the plurality of prism structures 1205 gradually decreases along a direction of being closer to the light guide plate body 1211.

Furthermore, the second light source 122 is disposed on the peripheral side of the light guide plate body 1211, and a side of the light guide plate body 1211 provided with the second light source 122 is set as a light incident side. The thickness of the light guide plate body 1211 gradually decreases along the direction of being away from the second light source 122. The side of the light guide plate body 1211 away from the light convergent layer 1212 is parallel to the display panel 20, and a side of the light guide plate body 1211 adjacent to the light convergent layer 1212 is arranged to be inclined to the display panel 20.

In this embodiment, the side of the light convergent layer 1212 adjacent to the light guide plate body 1211 is parallel to the side of the light guide plate body 1211 adjacent to the light convergent layer 1212. That is to say, the light convergent layer 1212 is also arranged to be inclined to the display panel 20.

In this embodiment, a thickness of the light incident side of the light guide plate body 1211 is set to be 2 micrometers, and a thickness of a side of the light guide plate body 1211 away from the light incident side is set to be 1 micrometers. A cross-sectional shape of the plurality of prism structures 1205 is a triangle, a base angle of the triangle is 68°, and a curve diagram of view angle and brightness as shown in FIG. 9 is obtained through an optical simulation.

Figure 9:
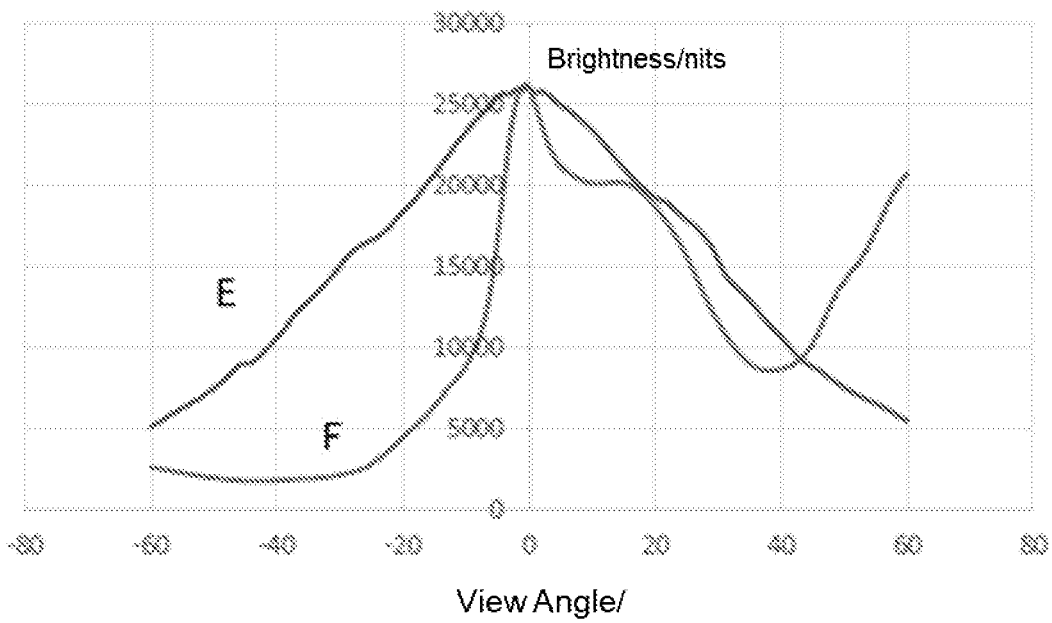
FIG. 9 is a curve diagram of yet another type of privacy-protection view angle and brightness of the backlight module provided by an embodiment of the present application.

As can be seen from FIG. 9, an abscissa indicates the view angle, an ordinate indicates the brightness, curve E indicates a curve of the horizontal view angle and the brightness, and the curve F indicates a curve of the vertical view angle and the brightness. Within a range of plus or minus 40°, the backlight module 10 provided by an embodiment of the present application has greater brightness, and in a large view angle range beyond plus or minus 40°, the brightness significantly decreases. A half-peak width of the curve F is between −5° and 30°, and a brightness can substantially reach 13000 nits, which can achieve an effective privacy-protection display effect.

Subsequently, in an embodiment of the present application, the at least one first light source 112 is turned on to achieve the regular display mode with a large view angle, and the at least one second light source 122 is turned on and the at least one first light source 112 is turned off to achieve the privacy-protection display mode with a small view angle. Therefore, the dynamic privacy-protection function can be achieved by the present application without reducing the display brightness of the display device.

Figure 10:
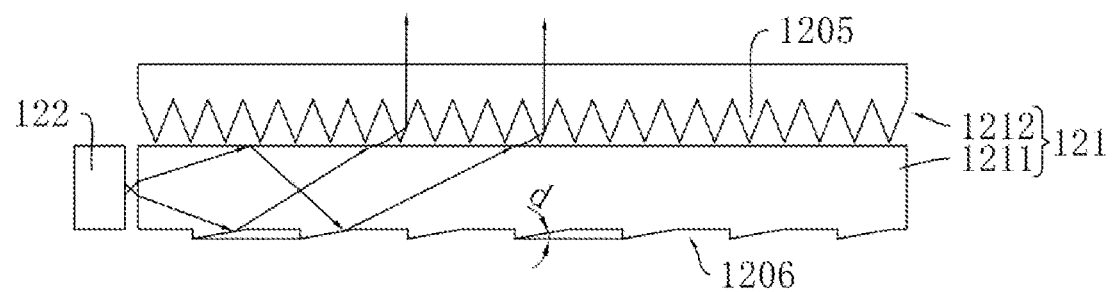
FIG. 10 is a schematic view of yet another type of structure of the second light-emitting component provided by an embodiment of the present application.
Figure 11:
FIG. 11 is a schematic view of a type of machining tool of a groove provided by an embodiment of the present application.

In another embodiment of the present application, referring to FIG. 1, FIG. 10, and FIG. 11, differences between this embodiment and the previous embodiments is that a structure of the light guide plate body 1211 and a structure of the light convergent layer 1212 are different.

In this embodiment, the thickness of the light guide plate body 1211 is uniform, the light guide plate body 1211 is parallel to the display panel 20, and the light convergent layer 1212 is parallel to the light guide plate body 1211.

The second light diffusing structure is disposed on the side of the light guide plate body 1211 away from the light convergent layer 1212, and the second light diffusing structure includes a plurality of grooves 1206 disposed on the light guide plate body 1211 away from the light convergent layer 1212. The plurality of prism structures 1205 are disposed on a side of the layer 1212 adjacent to the light guide plate body 1211, and a cross-sectional area of the prism structures 1205 gradually decreases along a direction from the light convergent layer 1212 to the light guide plate body 1211.

Optionally, each of the plurality of grooves 1206 includes a light diffusing surface on a side adjacent to the second light source 122, along the direction of being away from the second light source 122, a distance from the light diffusing surface to the display panel 20 gradually decreases, and an angle d between the light diffusing surface and the display panel 20 is greater than or equal to 10° and less than or equal to 20°, and a cross-sectional shape of the plurality of grooves 1206 can be a combination of a triangle and a rectangle, as shown in FIG. 10.

Optionally, a depth of the plurality of grooves 1206 is greater than or equal to 2 micrometers and less than or equal to 5 micrometers.

In this embodiment, the angle d between the light diffusing surface of the plurality of grooves 1206 and the display panel 20 is set to be 16.13°, and the depth of the plurality of grooves 1206 is 3.4 micrometer.

It should be noted that, in this embodiment, as shown in FIG. 11, the plurality of grooves 1206 can be manufactured by a machining tool 50, and a cross-sectional shape of the machining tool 50 can be a triangle. An angle g of the machining tool 50 contacting on a side of the plurality of grooves 1206 can be 102°. In addition, an angle h can be 3°, an angle f can be 75°, and a tool size and a machining method for the plurality of grooves 1206 in embodiments of the present application are not limited thereto.

Figure 12:
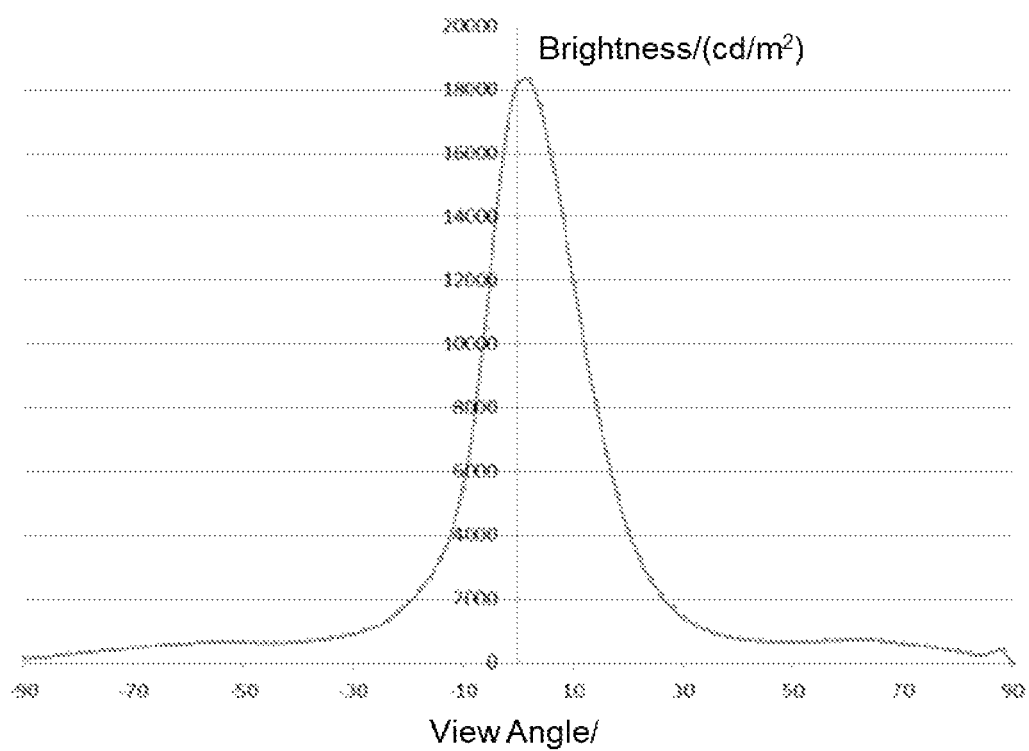
FIG. 12 is a curve diagram of yet another type of privacy-protection view angle and brightness of the backlight module provided by an embodiment of the present application.

Through an optical simulation, a curve diagram of view angle and brightness as shown in FIG. 12 are obtained, an abscissa indicates the view angle, and an ordinate indicates the brightness. In this embodiment. Within a view angle range of plus or minus 30°, the brightness increases sharply, and within a large view angle range beyond plus or minus 30°, the brightness of the backlight module 10 decreases to be lower than 1000 cd/m$^2$, which indicates that the backlight module 10 provided in an embodiment of the present application has the privacy-protection effect that can be tested effectively.

Figure 13:
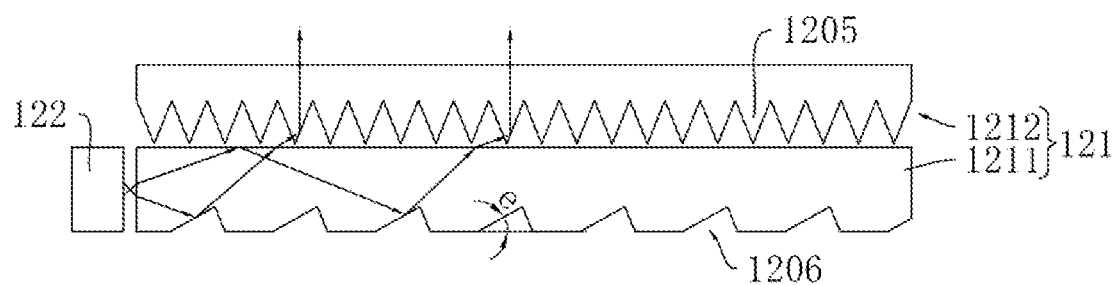
FIG. 13 is a schematic view of yet another type of structure of the second light-emitting component provided by an embodiment of the present application.

In addition, in other embodiments of the present application, referring to FIG. 13, each of the plurality of grooves 1206 includes the light diffusing surface on the side adjacent to the second light source 122. Along the direction of being away from the second light source 122, a distance between the light diffusing surface and the display panel 20 gradually decreases, an angle e between the light diffusing surface and the display panel 20 is greater than or equal to 10° and less than or equal to 20°, and a cross-sectional shape of the plurality of grooves 1206 can be a triangle.

Subsequently, in an embodiment of the present application, the at least one first light source 112 is turned on to achieve the regular display mode with a large view angle, and the at least one second light source 122 is turned on and the at least one first light source 112 is turned off to achieve the privacy-protection display mode with a small view angle. Therefore, the dynamic privacy-protection function can be achieved by the present application without reducing the display brightness of the display device.

Figure 14:
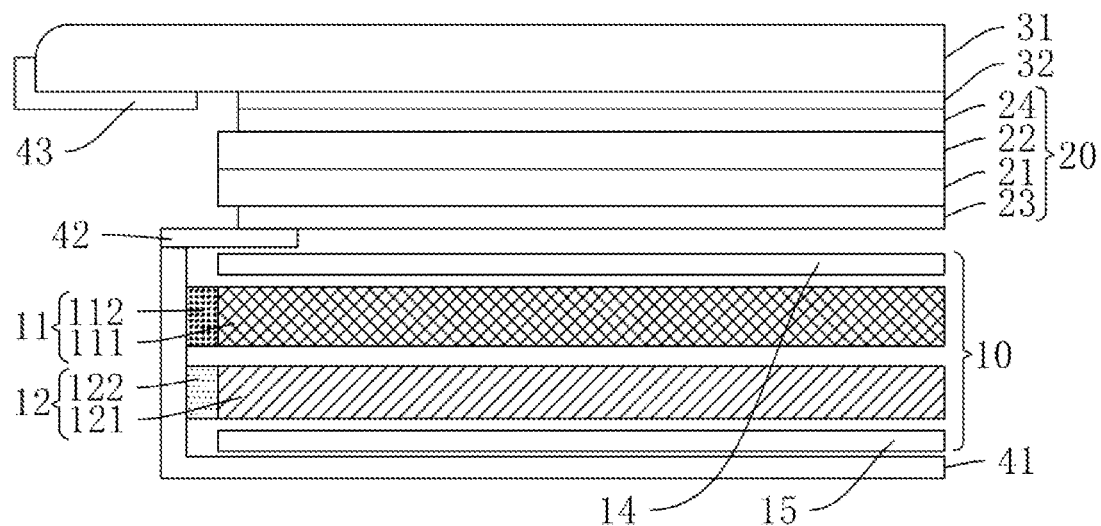
FIG. 14 is a schematic view of another type of structure of the display device provided by an embodiment of the present application.

In another embodiment of the present application, referring to FIG. 2 and FIG. 14, differences between this embodiment and the first embodiment is that a structure of the backlight module 10 is different.

In this embodiment, the second light-emitting component 12 is disposed on a side of the display panel 20, and the first light-emitting component 11 is disposed between the second light-emitting component 12 and the display panel 20.

In addition, the backlight module 10 further includes the reflective sheet 15 disposed on a side of the second light-emitting component 12 away from the display panel 20 and the brightness-enhancing film 14 disposed between the first light-emitting component 11 and the display panel 20. That is to say, compared with the first embodiment, a utilization of the diffuser film is reduced in this embodiment. Since the second light-emitting component 12 is disposed on the side of the first light-emitting component 11 away from the display panel 20 in this embodiment, if the diffuser film is arranged between the second light-emitting component 12 and the first light-emitting component 11, a light exit effect of the second light-emitting component 12 can be affected. Therefore, in this embodiment, arranging the diffuser film between the second light-emitting component 12 and the first light-emitting component 11 is not necessary.

In addition, an embodiment of the present application further provides a backlight module. Referring to FIG. 1 or FIG. 14. A backlight module 10 includes a first light-emitting component 11 and a second light-emitting component 12.

The first light-emitting component 11 includes a regular light guide plate 111 and at least one first light source 112 disposed on a peripheral side of the regular light guide plate 111, an angle between a light emitted by the first light-emitting component 11 and a first direction X is less than or equal to a first preset angle, and the first direction X is a direction perpendicular to the regular light guide plate 111.

The second light-emitting component 12 includes a collimated light guide plate 121 disposed on a side of the regular light guide plate 111 and at least one second light source 122 disposed on a peripheral side of the collimated light guide plate 121, and an angle between a light emitted by the second light-emitting component 12 and the first direction X is less than or equal to a second preset angle, and the second preset angle is less than the first preset angle.

The backlight module 10 switches between a first mode and a second mode. In the first mode, the at least one first light source 112 is turned on, and in the second mode, the at least one first light source 112 is turned off and the at least one second light source 122 is turned on.

The backlight module includes a light-emitting surface. A first light diffusing structure is provided on a side of the regular light guide plate 111 away from the light-emitting surface. The collimated light guide plate 121 includes a light guide plate body 1211 and a light convergent layer 1212 disposed on a side of the light guide plate body 1211 adjacent to the light-emitting surface. A second light diffusing structure is provided on a side of the light guide plate body 1211 away from the light convergent layer 1212, and the light convergent layer 1212 converges the light emitted by the second light source 122.

It should be noted that, in the backlight module provided by an embodiment of the present application, the first mode corresponds to the regular display mode of the display device, and the second mode corresponds to the privacy-protection display mode of the display device. In addition, other structures and arrangements of the collimated light guide plate 121 can be arranged with reference to the above-mentioned embodiments, which will not be reiterated herein.

Subsequently, in an embodiment of the present application, the first light-emitting component 11 and the second light-emitting component 12 are provided in the backlight module 10, the second light-emitting component 12 includes the collimated light guide plate 121, so as to converge the light emitted by the second light source 122, and a maximum light exit angle of the second light-emitting component 12 is smaller than a maximum light exit angle of the first light-emitting component 11. Furthermore, in the regular display mode, the at least one first light source 112 is turned on, i.e., at least the first light-emitting component 11 is utilized, so as to achieve a regular display. In the privacy-protection display mode, the at least one second light source 122 is turned on and the at least one first light source 112 is turned off, i.e., only the second light-emitting component 12 is utilized, so as to reduce a view angle range of the display device, thereby achieving the privacy-protection display. Therefore, a dynamic privacy-protection function can be achieved by the present application without reducing a display brightness of the display device.

In the above embodiments, the descriptions of the various embodiments are different in emphases, for contents not described in detail, please refer to related description of other embodiments.

The backlight module and the display device provided by embodiments of the present application are described in detail above, and the description of embodiments above is only for helping to understand technical solutions of the present application and its core idea. It should be understood that for a person of ordinary skill in the art can make various modifications of the technical solutions of the embodiments of the present application above. However, it does not depart from the scope of the technical solutions of the embodiments of the present application.

What is claimed is:

1. A display device, the display device comprising a display panel and a backlight module disposed on a side of the display panel;
the back light module comprising:
a first light-emitting component comprising a regular light guide plate disposed on a side of the display panel and at least one first light source disposed on a peripheral side of the regular light guide plate, wherein an angle between a light emitted by the first light-emitting component and a first direction is less than or equal to a first preset angle, and the first direction is a direction from the backlight module to the display panel; and
a second light-emitting component comprising a collimated light guide plate disposed on a side of the regular light guide plate and at least one second light source disposed on a peripheral side of the collimated light guide plate, wherein an angle between a light emitted by the second light-emitting component and the first direction is less than or equal to a second preset angle, and the second preset angle is less than the first preset angle;

wherein the display device switches between a regular display mode and a privacy-protection display mode, under the regular display mode, the at least one first light source is turned on, and under the privacy-protection display mode, the at least one first light source is turned off and the at least one second light source is turned on;

the collimated light guide plate comprises a light guide plate body and a light convergent layer disposed on a side of the light guide plate body adjacent to the display panel, and the display device further comprises a first light diffusing structure provided on a side of the light guide plate body away from the light convergent layer; and the first light diffusing structure comprises a plurality of first protrusions disposed on the side of the light guide plate body away from the light convergent layer, a plurality of second protrusions are disposed on a side of the light convergent layer away from the light guide plate body, and one of the plurality of the first protrusions is disposed correspondingly to one of the plurality of the second protrusions.

2. The display device according to claim 1, wherein the display device further comprises a second light diffusing structure provided on a side of the regular light guide plate away from the display panel.

3. The display device according to claim 1, wherein a number of the at least one first light source is greater than or equal to one, and a number of the at least one second light source is less than or equal to two.

4. The display device according to claim 2, wherein, in a direction from the plurality of first protrusions to the plurality of second protrusions correspondingly, a cross-sectional area of the plurality of first protrusions along a direction parallel to the collimated guide plate gradually increases, and a cross-sectional area of the plurality of second protrusions along the direction parallel to the collimated light guide plate gradually decreases;

wherein an orthographic projection of the plurality of first protrusions on the display panel overlaps an orthographic projection of the plurality of second protrusions on the display panel.

5. The display device according to claim 2, wherein a distribution density of the plurality of first protrusions gradually increases in a direction away from the at least one second light source.

6. The display device according to claim 2, wherein a material of the light guide plate body is same as a material of the light convergent layer.

7. The display device according to claim 1, wherein the second light-emitting component is disposed on a side of the first light-emitting component adjacent to the display panel and the backlight module further comprises a diffuser film disposed between the second light-emitting component and the first light-emitting component;

or, the second light-emitting component is disposed on a side of the first light-emitting component away from the display panel.

8. The display device according to claim 7, wherein the backlight module further comprises a brightness-enhancing film and a reflective sheet, the brightness-enhancing film is disposed on a side of the first light-emitting component and a side of the second light-emitting component that are both adjacent to the display panel, and the reflective sheet is disposed on a side of the first light-emitting component and a side of the second light-emitting component that are both away from the display panel.

9. A display device, the display device comprising a display panel and a backlight module disposed on a side of the display panel;

the back light module comprising:

a first light-emitting component comprising a regular light guide plate disposed on a side of the display panel and at least one first light source disposed on a peripheral side of the regular light guide plate, wherein an angle between a light emitted by the first light-emitting component and a first direction is less than or equal to a first preset angle, and the first direction is a direction from the backlight module to the display panel; and a second light-emitting component comprising a collimated light guide plate disposed on a side of the regular light guide plate and at least one second light source disposed on a peripheral side of the collimated light guide plate, wherein an angle between a light emitted by the second light-emitting component and the first direction is less than or equal to a second preset angle, and the second preset angle is less than the first preset angle;

wherein the display device switches between a regular display mode and a privacy-protection display mode, under the regular display mode, the at least one first light source is turned on, and under the privacy-protection display mode, the at least one first light source is turned off and the at least one second light source is turned on;

the collimated light guide plate comprises a light guide plate body and a light convergent layer disposed on a side of the light guide plate body adjacent to the display panel, and the display device further comprises a first light diffusing structure provided on a side of the light guide plate body away from the light convergent layer; and the first light diffusing structure comprises a plurality of concave portions disposed on the side of the light guide plate body away from the light convergent layer, a plurality of convex lens portions are disposed on a side of the light convergent layer away from the light convergent layer, and one of the plurality of concave portions is disposed corresponding to one of the plurality of convex lens portions.

10. The display device according to claim 9, wherein an orthographic projection of each of the plurality of concave portions on the display panel is within a coverage range of an orthographic projection of the plurality of convex lens portions correspondingly on the display panel, and a center line of the plurality of concave portions coincides with a main optical axis of the plurality of convex lens portions.

11. The display device according to claim 10, wherein each of the plurality of concave portions is at a focal point on a side of the plurality of convex lens portions correspondingly adjacent to the light guide plate body.

12. The display device according to claim 9, wherein a refractive index of the light convergent layer is greater than a refractive index of the light guide plate body, and the light convergent layer is attached to the side of the light guide plate body adjacent to the display panel or the light convergent layer and the light guide plate body are spaced apart.

13. The display device according to claim 12, wherein the at least one second light source is disposed on a peripheral side of the light guide plate body, so that the light emitted by the at least one second light source enters the light guide plate body.

14. The display device according to claim 9, wherein a distribution density of the plurality of concave portions gradually increases in a direction away from the at least one second light source.

15. A display device, the display device comprising a display panel and a backlight module disposed on a side of the display panel;
the back light module comprising:
a first light-emitting component comprising a regular light guide plate disposed on a side of the display panel and at least one first light source disposed on a peripheral side of the regular light guide plate, wherein an angle between a light emitted by the first light-emitting component and a first direction is less than or equal to a first preset angle, and the first direction is a direction from the backlight module to the display panel; and
a second light-emitting component comprising a collimated light guide plate disposed on a side of the regular light guide plate and at least one second light source disposed on a peripheral side of the collimated light guide plate, wherein an angle between a light emitted by the second light-emitting component and the first direction is less than or equal to a second preset angle, and the second preset angle is less than the first preset angle;
wherein the display device switches between a regular display mode and a privacy-protection display mode, under the regular display mode, the at least one first light source is turned on, and under the privacy-protection display mode, the at least one first light source is turned off and the at least one second light source is turned on;
the collimated light guide plate comprises a light guide plate body and a light convergent layer disposed on a side of the light guide plate body adjacent to the display panel; and
a plurality of prism structures are disposed on a side of the light convergent layer adjacent to the light guide plate body, and a cross-sectional area of each of the plurality of prism structures along a direction of being closer to the light guide plate body gradually decreases, and the side of the light convergent layer adjacent to the light guide plate body is parallel to a side of the light guide plate body adjacent to the light convergent layer.

16. The display device according to claim 15, wherein the peripheral side of the light guide plate body comprises a light incident side provided with the at least one second light source, a thickness of the light guide plate body along a direction of being away from the light incident side gradually decreases, the side of the light guide plate body away from the light convergent layer is parallel to the display panel, and a surface on the side of the light guide plate body adjacent to the light convergent layer is arranged to be inclined to the display panel.

17. The display device according to claim 15, wherein the display device further comprises a first light diffusing structure provided on a side of the light guide plate body away from the light convergent layer, a surface on a side of the light guide plate body adjacent to the light convergent layer is parallel to the display panel, and the first light diffusing structure comprises a plurality of grooves disposed on the side of the light guide plate body away from the light convergent layer, and each of the plurality of grooves comprises a light diffusion surface adjacent to a side of the at least one second light source, wherein, in a direction away from the at least one second light source, a distance from the light diffusion surface to the display panel gradually decreases, and an angle between the light diffusion surface and the display panel is greater than or equal to 10° and less than or equal to 20°.

18. A backlight module comprising:
a first light-emitting component comprising a regular light guide plate and at least one first light source disposed on a peripheral side of the regular light guide plate, wherein an angle between a light emitted by the first light-emitting component and a first direction is less than or equal to a first preset angle, and the first direction is a direction vertical to the regular light guide plate; and
a second light-emitting component comprising a collimated light guide plate disposed on a side of the regular light guide plate and at least one second light source disposed on a peripheral side of the collimated light guide plate, wherein an angle between a light emitted by the second light-emitting component and the first direction is less than or equal to a second preset angle, and the second preset angle is less than the first preset angle;
wherein the backlight module switches between a first mode and a second mode, under the first mode, the at least one first light source is turned on, and under the second mode, the at least one first light source is turned off and the at least one second light source is turned on;
the collimated light guide plate comprises a light guide plate body and a light convergent layer disposed on a side of the light guide plate body adjacent to the display panel; and
a plurality of prism structures are disposed on a side of the light convergent layer adjacent to the light guide plate body, and a cross-sectional area of each of the plurality of prism structures along a direction of being closer to the light guide plate body gradually decreases, and the side of the light convergent layer adjacent to the light guide plate body is parallel to a side of the light guide plate body adjacent to the light convergent layer.

19. The backlight module according to claim 18, wherein the backlight module further comprises a light-emitting surface, a first light diffusing structure provided on a side of the regular light guide plate away from the light-emitting surface, and a second light diffusing structure disposed on a side of the light guide plate body away from the light convergent layer.

* * * * *